June 11, 1929.　　J. H. HENDRICKSON　　1,716,959
ANIMAL TRAP
Filed May 16, 1928　　2 Sheets-Sheet 1
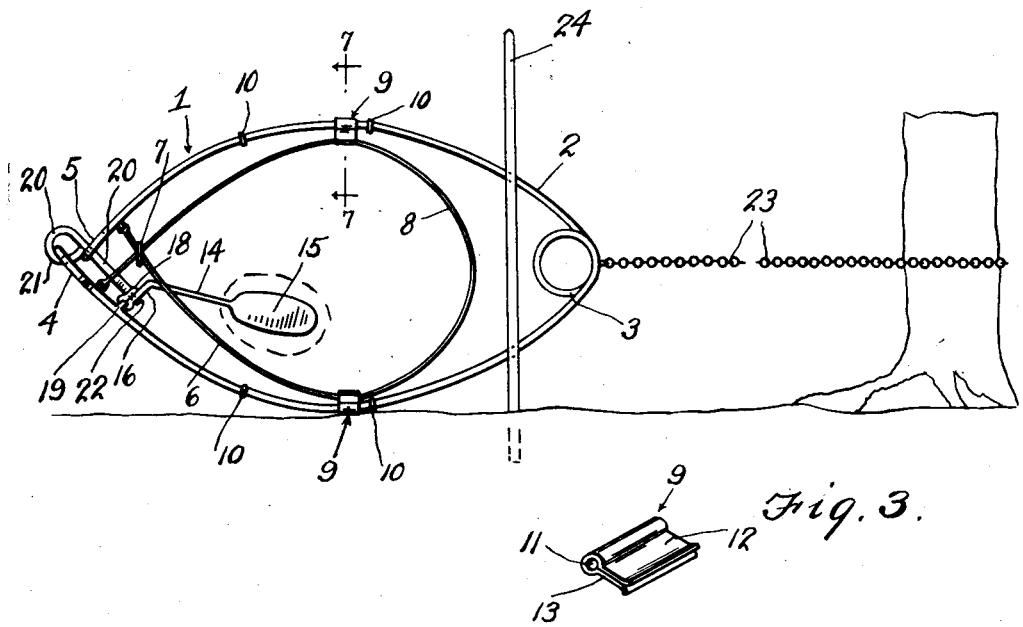
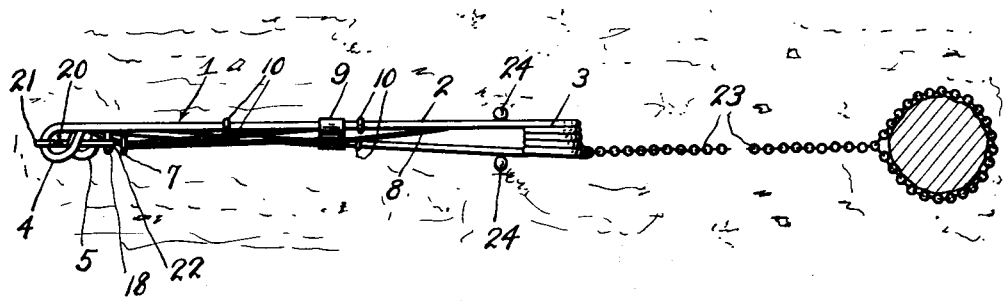
Inventor
John H. Hendrickson
By Clarence A. O'Brien
Attorney

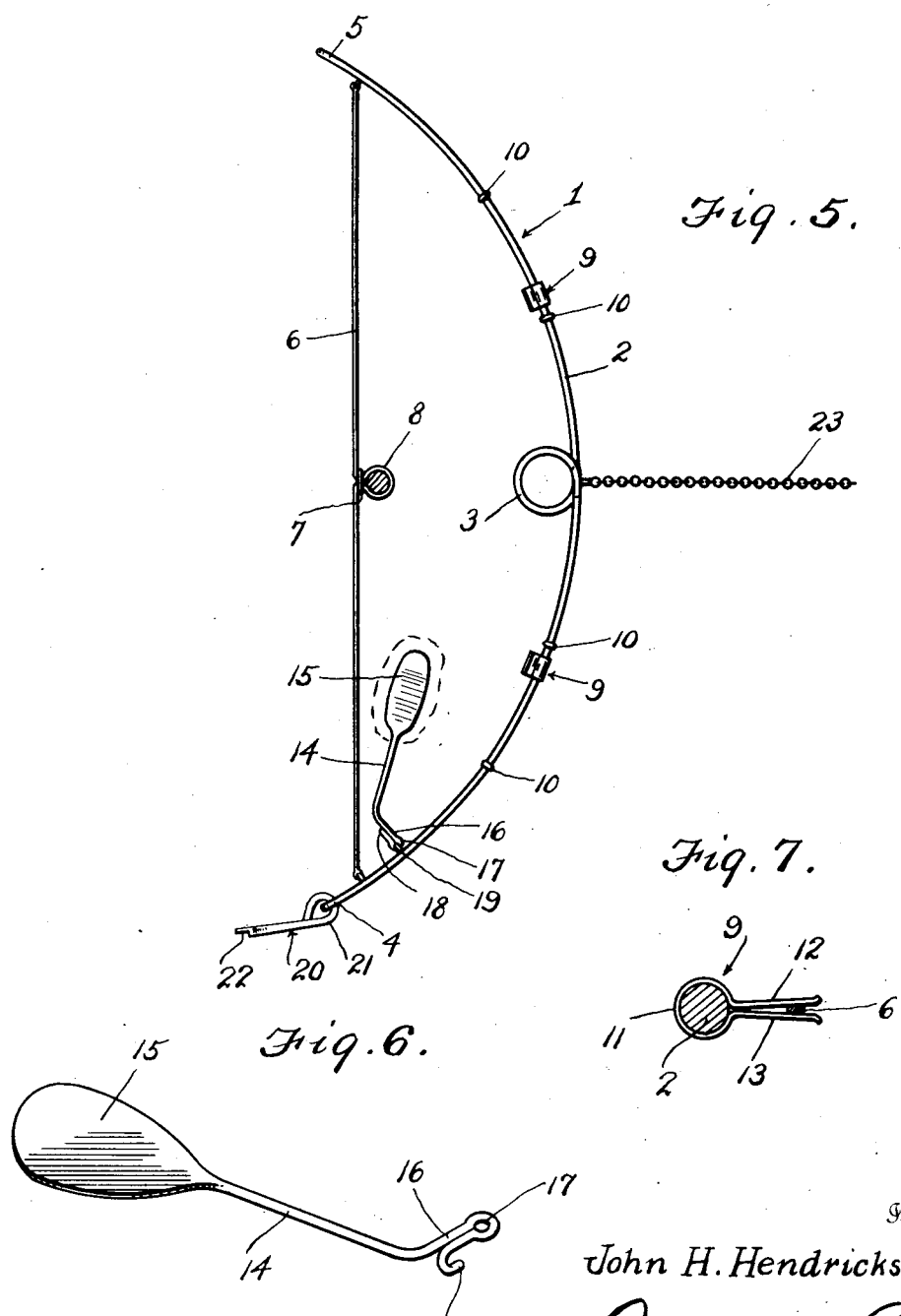

Patented June 11, 1929.

1,716,959

UNITED STATES PATENT OFFICE.

JOHN H. HENDRICKSON, OF CHISHOLM, MINNESOTA.

ANIMAL TRAP.

Application filed May 16, 1928. Serial No. 278,198.

The present invention relates to improvements in animal traps of the choking type.

One of the important objects of the present invention is to provide an animal trap which includes a spring bow with which is associated a constricting noose, means being provided for holding the trap in a set position, said means being released by an animal and simultaneously causing the noose to be drawn tightly around the animal by the action of the spring bow.

Another important object of the invention is to provide an animal trap of the above mentioned character which will, at all times be positive and efficient in its operation, the same being further simple in construction, inexpensive, strong and durable, and further well adapted to the purpose for which it is designed.

Other objects of the invention will become apparent as the nature of the invention proceeds and when taken in connection with the accompanying drawings.

In the accompanying drawings, forming a part of this application and in which like numerals designate like parts throughout the several views:

Figure 1 is a side elevation of the animal trap embodying my invention, showing the manner in which the same is set in position to catch an animal.

Figure 2 is a top plan view thereof.

Figure 3 is a detail perspective view of one of the clips for holding the noose in an open position.

Figure 4 is a detail perspective view of the trigger.

Figure 5 is a side elevation of the trap after the same has been sprung.

Figure 6 is a detail perspective view of the animal engaging member or bait holder, and Figure 7 is a sectional view, taken approximately on the line 7—7 of Figure 1.

In the drawings, wherein for the purpose of illustration is shown the preferred embodiment of my invention, the numeral 1 designates generally my improved animal trap, the same comprising a spring bow that is formed from a single strand of spring wire. This bow 2 has its intermediate portion coiled to form a spring 3, which spring has a tendency to normally urge the free ends of the bow outwardly, so that the bow will be of substantially arcuate shape, when extended. Each end of the bow is bent back upon itself to form the loops 4 and 5 respectively. A flexible cable or steel wire 6 is adapted to form the noose and is secured at its respective ends to the bow 2, adjacent the looped ends thereof and a ring 7 is loosely slidable over the cable or wire 6, whereby to form a central noose 8 and this noose is held in an open position by either of the spring clips 9 that are slidably and detachably arranged on the bow 1 on opposite sides of the coiled spring portion 3. Suitable shoulders or flanges 10 are formed on the bow 1 and are arranged in pairs, between which each of the spring clips is slidable and these shoulders 10 are preferably arranged between the respective ends of the bow and the central spring portion 3, as clearly disclosed in Figures 1 and 5 of the drawings.

Each spring clip 9 is formed of a piece of spring metal bent back upon itself to form a sleeve 11, and a pair of spring jaws 12 and 13 respectively, between which a portion of the noose forming cable or wire 6 is clamped, as clearly shown in Figure 7. The free edges of the jaw members are slightly curved outwardly in opposite directions to provide a wide mouth, whereby to facilitate the ready and easy insertion of the noose forming wire, between the jaws of the respective spring clips.

The invention further comprehends the provision of a rod 14, that is flattened at one end to form a relatively large bait holder portion 15. The other end of the rod is disposed laterally as at 16, and the laterally disposed portion is bent back upon itself to form an eye 17 at the bend the free end portion of the laterally disposed portion 16 being formed with a trigger engaging hook 18 and the construction of this member is more clearly disclosed in Figure 6 of the drawings.

The bait holding member is pivotally secured to the spring bow 1 adjacent one end thereof as at 19.

The trigger shown generally at 20, in Figure 4, comprises a piece of wire bent at one end to form an eye 21, that engages with the opposite looped end of the spring bow 1 and the free end of this rod is formed with the hook engaging shoulder 22.

In setting the trap, an anchoring chain which is secured to the central portion of the spring bow and designated by the numeral 23 is secured around a tree trunk.

The free ends of the spring bow are brought together, and the trigger is then passed through the looped free end of the bow and the shoulder 22 will engage with the hook 18 to maintain the bait holding member in a predetermined position and to further secure the free ends of the spring bow together so that said spring bows will maintain a substantially elliptical shape, as shown very clearly in Figure 1. The noose 8 is open, and is retained in such position by the spring clips 9. The clamp is disposed vertically and is held in this position by suitable stakes 24 that are driven downwardly into the ground on opposite sides of the spring bow, as is clearly shown in Figure 2.

As soon as the animal touches the bait holding portion 15, said member will be actuated to disengage the shoulder 22 from the hook 18 and the resiliency of the spring bow will cause the trigger 20 to become disengaged from the rear end of the spring bow, so that said spring bow will spring outwardly to the position shown in Figure 5 and simultaneously the noose 8 will be disengaged from the spring clip 9 and will be constricted around the neck or other part of the body of the animal, as is also shown in Figure 5, whereby to produce a choking action to kill the animal almost instantaneously, and the harder the animal caught in the trap pulls on the noose, the tighter the noose will hold. Furthermore, when the spring bow is tripped, it will spring into the air which will result in a snapping action to more readily cause the death of the animal by breaking its neck.

The simplicity of my improved trap enables the same to be readily and easily set and the trap will at all times be positive and efficient in its operation as well as being strong and durable.

While I have shown the preferred embodiment of my invention, it is to be understood that various changes in the size, shape and arrangement of parts may be resorted to, without departing from the spirit of the invention and the scope of the appended claims.

Having thus described my invention, what I claim as new is:

1. In an animal trap, a spring bow provided with a constricting noose, a bait holder pivotally secured to the spring bow adjacent one end thereof, a trigger carried by one end of the spring bow and adapted to extend through a loop formed in the other end of the spring bow, the free end of the trigger engaging with the bait member to hold the spring bow in a set position, and means for holding the noose in an open position while the trap is set, said means comprising a pair of spring clips carried by the spring bow and engaging the noose at diametrically opposite points.

2. In an animal trap, a spring bow formed with a coil spring at its intermediate portion, the free ends of the spring bow being formed with loops, a trigger attached at one end to one of the looped ends of the spring bow and adapted to extend through the other looped end of said bow to hold the spring bow in a contracted position, a bait holder carried by the spring bow and cooperating with the free end of the trigger to hold the latter in an operative position, a constricting noose attached at its respective ends to the spring bow adjacent the free ends thereof, and means for holding the constricting noose in an open position while the trap is set.

3. In an animal trap, a spring bow formed with a coil spring at its intermediate portion, the free ends of the spring bow being formed with loops, a trigger attached at one end to one of the looped ends of the spring bow and adapted to extend through the other looped end of said bow to hold the spring bow in a contracted position, a bait holder carried by the spring bow and cooperating with the free end of the trigger to hold the latter in an operative position, a constricting noose attached at its respective ends to the spring bow adjacent the free ends thereof, and means for holding the constricting noose in an open position while the trap is set, said means comprising a pair of spring clips carried by the spring bow and engaging the noose at diametrically opposite points.

In testimony whereof I affix my signature.

JOHN H. HENDRICKSON.